Aug. 21, 1934.    H. A. KNOX    1,970,568
TRACK FOR TRACK LAYING VEHICLES
Filed Sept. 28, 1933
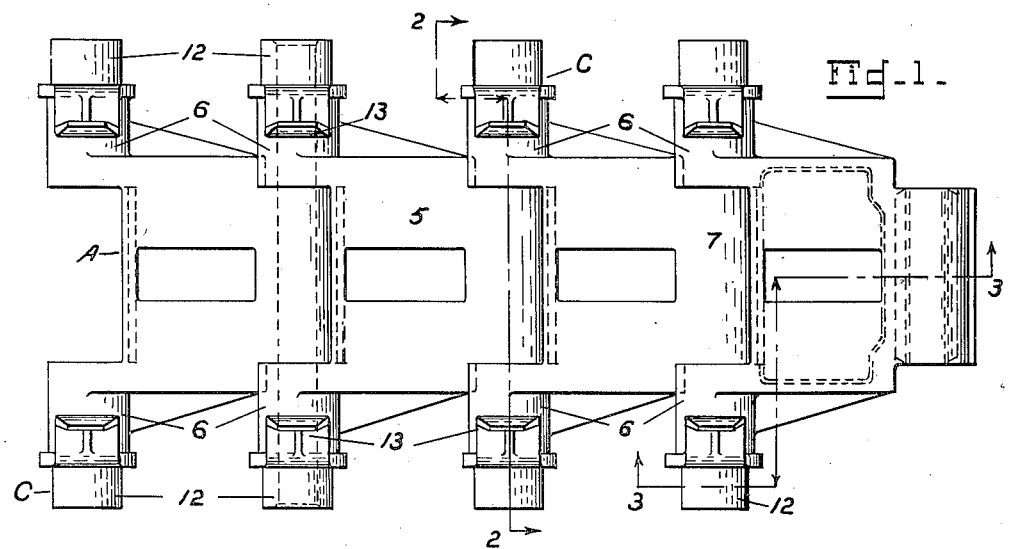
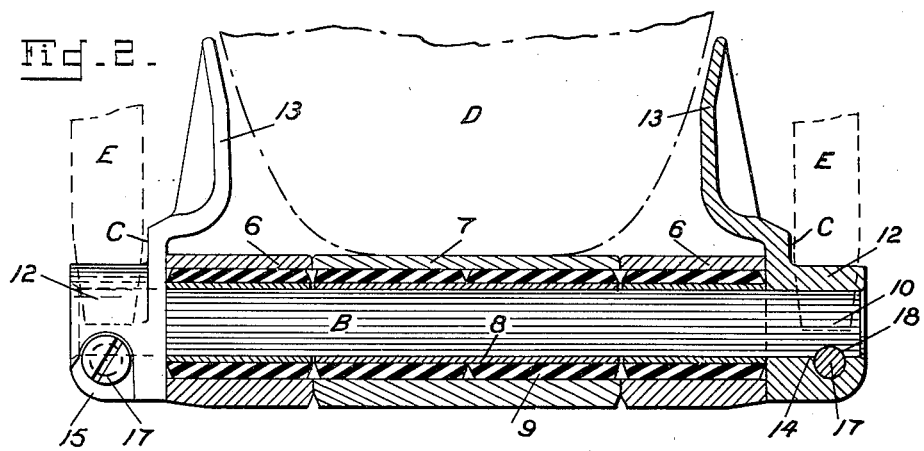
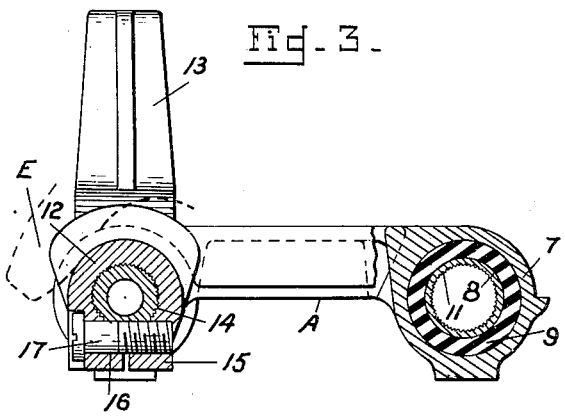
Inventor
Harry A. Knox
By W. N. Roach
Attorney

UNITED STATES PATENT OFFICE 1,970,568

TRACK FOR TRACK-LAYING VEHICLES

Harry A. Knox, Davenport, Iowa

Application September 28, 1933, Serial No. 691,336

2 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a track for track-laying vehicles.

The purpose of this invention is to provide a novel mounting of a combination driving and guide lug on the link pin of a track. The mounting is of especial significance where a bushing of resilient material, such as rubber, is placed between the link pin and the links.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view partly in section of a portion of the lower flight of the improved track.

Fig. 2 is a sectional view on the line 2—2 of Fig. 1.

Fig. 3 is a sectional view on the line 3—3 of Fig. 1.

The track comprises a series of grousers or shoes A constituting link members connected by means of link pins B.

The shoes are all identical and each one consists of a body 5 having spaced bearings 6—6 on one end and a single centrally located bearing 7 on the opposite end whose width is substantially equal to the spacing between the end bearings. When two shoes are assembled end to end the bearing 7 of one shoe is adapted to fit between the spaced bearings 6 of the other shoe.

Within each of the bearings is a bushing consisting of an inner metal tube 8 and an outer rubber sleeve 9 vulcanized to the metal tube. The bushing is inserted in the bearing by compressing the rubber sleeve and it is thereby firmly held in place.

The link pin B passes through the aligned bearings 6 and 7 of adjoining shoes. The pin is provided along its entire length with serrations or teeth 10 interengaging with similar serrations or teeth 11 in the metal tubes 8. By virtue of this arrangement the link pin B is held against free rotational movement when either one of the adjoining shoes are fixed and the angular movement occurs through distortion of the rubber sleeves 9.

The link pin B extends beyond the end bearings 6 of a shoe A and on each of its ends is mounted a member C consisting of a sleeve 12 constituting a driving lug and an upstanding arm 13 constituting a guide lug. The sleeve 12 is preferably formed internally with serrations 14 interengaging with the serrations 10 on the link pin B, so that it is keyed to the link pin. The sleeve is formed with an enlarged bottom or ground-engaging portion 15 having a threaded aperture 16 disposed parallel to the shoes A. A bolt 17 threaded in the aperture 16 engages a tangential groove 18 in the link pin B and serves to lock the member C on the link pin. With the members C on opposite ends of the link pin in engagement with the outer faces of the bearings 6 of a shoe A, the link pin is held against displacement laterally of the track.

Since the link pin B by virtue of its mounting does not freely rotate and since the member C is fixed to the link pin, the upstanding arm 13 constituting the guide lug will normally be positioned perpendicular to the track. If the arm 13 is engaged by the wheel D or any other object it may be angularly displaced about the axis of the link pin B. This displacement will be yieldingly opposed by the rubber bushings 9 which upon reaction insure restoration of the arms 13 to their original position.

When the sleeve 12 of the member C is engaged by the sprocket wheel, generally indicated at E, the link pin B which carries the member C, will be yieldingly supported by the rubber bushings 9.

I claim:

1. In a track for track-laying vehicles, a series of links, each link comprising a body having alternately arranged bearings on opposite ends, the bearings of adjoining links being interfitting, a bushing in each bearing including a resilient member, a link pin inserted through aligned bushings and held against rotational movement relative thereto, a sleeve on each end of the link pin, said sleeve having an enlarged portion, a bolt in said enlarged portion tangentially engaging the link pin, and an upstanding arm on the sleeve.

2. In a track for track-laying vehicles, a series of links, each link comprising a body having alternately arranged bearings on opposite ends, the bearings of adjoining links being interfitting, a bushing in each bearing including a resilient member, a link pin inserted through aligned bushings and held against rotational movement relative thereto, a sleeve on each end of the link pin, means for securing the sleeve to the link pin, and an upstanding arm on the sleeve.

HARRY A. KNOX.